US012764447B2

(12) United States Patent
Callahan et al.

(10) Patent No.: US 12,764,447 B2
(45) Date of Patent: Oct. 13, 2026

(54) AUDIO DEVICE WITH ACCESSORY COUPLER

(71) Applicant: Bose Corporation, Framingham, MA (US)

(72) Inventors: Cameron Robert Callahan, Boston, MA (US); David Louis Pepin, Sutton, MA (US); Caleb Drake, Brighton, MA (US); James Richard Paldino, Worcester, MA (US); Christopher Ratcliffe, Williamsburg, VA (US); Steve Palumbo, Auburn, MA (US); Colin Vogel Stievater, Belmont, MA (US); Nathan David Schaal, San Francisco, CA (US)

(73) Assignee: Bose Corporation, Framingham, MA (US)

( * ) Notice: Subject to any disclaimer, the term of this patent is extended or adjusted under 35 U.S.C. 154(b) by 165 days.

(21) Appl. No.: 18/407,980

(22) Filed: Jan. 9, 2024

(65) Prior Publication Data

US 2025/0227399 A1 Jul. 10, 2025

(51) Int. Cl.
*H04R 1/02* (2006.01)
*H04R 1/28* (2006.01)

(52) U.S. Cl.
CPC ........... *H04R 1/026* (2013.01); *H04R 1/2834* (2013.01)

(58) Field of Classification Search
CPC .......... F16B 5/02; F16B 21/04; F16B 45/002; F16B 2/18; H04R 1/026; H04R 1/2834; H04R 2201/02; H04R 1/02; H04R 2400/11; H04R 1/025; H04R 2201/029; H04R 1/345; H04R 2201/021; H04R 2201/025; H04R 1/323; A45C 2013/223; A45C 11/00; A45C 13/30; A45C 11/003; A45F 3/14; A45F 5/1525; E05B 65/5284; Y10T 70/5009; F16M 13/022; F16M 2200/022
USPC ........................................ 381/386, 334, 345
See application file for complete search history.

(56) References Cited

U.S. PATENT DOCUMENTS

| | | | | |
|---|---|---|---|---|
| 10,405,075 | B2 * | 9/2019 | Cheney | A45C 13/00 |
| D918,742 | S * | 5/2021 | Feng | D26/41 |
| 11,277,678 | B2 | 3/2022 | Eva | |
| 11,317,183 | B2 | 4/2022 | Shen et al. | |
| 11,627,397 | B1 * | 4/2023 | Filipek | H04R 1/26 381/332 |
| 11,755,281 | B1 | 9/2023 | Trapp et al. | |
| 11,839,290 | B1 * | 12/2023 | Lynch | A45F 5/00 |
| 2005/0174727 | A1 * | 8/2005 | Thomas | G06F 1/1626 361/679.56 |
| 2006/0213940 | A1 * | 9/2006 | Chen | H04M 1/0249 224/269 |

(Continued)

OTHER PUBLICATIONS

PCT International Search Report and Written Opinion for International Application No. PCT/US2025/010042, dated Mar. 31, 2025, 13 pages.

*Primary Examiner* — Carolyn R Edwards
*Assistant Examiner* — Julie X Dang
(74) *Attorney, Agent, or Firm* — Hoffman Warnick LLC

(57) ABSTRACT

Various implementations include audio devices. Certain implementations include an audio device including: a body, a slot recessed from an outer surface of the body, and a coupler in the slot, the coupler including at least one protrusion for selectively engaging an accessory attachment for an accessory.

22 Claims, 7 Drawing Sheets

(56) References Cited

U.S. PATENT DOCUMENTS

| | | | | |
|---|---|---|---|---|
| 2010/0327030 | A1* | 12/2010 | Yang | A45F 5/00 224/199 |
| 2011/0225771 | A1* | 9/2011 | Bartnick | B60N 3/026 16/429 |
| 2013/0001382 | A1* | 1/2013 | Jang | A45F 5/10 248/176.1 |
| 2013/0251187 | A1* | 9/2013 | Sumitani | H04R 1/026 381/387 |
| 2014/0013789 | A1* | 1/2014 | Conrad | F25D 3/08 62/331 |
| 2014/0355806 | A1* | 12/2014 | Graff | H04R 1/2834 381/334 |
| 2015/0139464 | A1* | 5/2015 | Guo | H04R 1/04 381/334 |
| 2016/0269838 | A1 | 9/2016 | Harte et al. | |
| 2017/0222683 | A1* | 8/2017 | Adelmann | G06F 1/1632 |
| 2018/0295433 | A1* | 10/2018 | Fustino | H04R 1/2834 |
| 2020/0186901 | A1* | 6/2020 | Brousseau | F16M 13/02 |
| 2021/0160601 | A1* | 5/2021 | Eva | H04R 1/026 |
| 2021/0328613 | A1* | 10/2021 | Worcester | H04R 1/028 |
| 2022/0038800 | A1* | 2/2022 | Prendergast | G10H 1/32 |
| 2023/0300228 | A1* | 9/2023 | Mody | H04M 1/022 455/566 |
| 2024/0138811 | A1* | 5/2024 | Akkaraju | A61B 8/5207 |

* cited by examiner

AUDIO DEVICE WITH ACCESSORY COUPLER

TECHNICAL FIELD

This disclosure generally relates to audio devices. More particularly, the disclosure relates to an audio device with at least one accessory coupler.

BACKGROUND

Certain audio devices, such as portable speakers, can benefit from accessories such as carrying straps, mounting straps, etc., that make transport and dynamic usage easier. However, accessories on conventional audio devices can be unwieldy, and have limited use when the device is not being transported.

SUMMARY

All examples and features mentioned below can be combined in any technically possible way.

Various implementations include audio devices with an accessory coupler. Certain implementations include accessories for coupling with an audio device.

In particular aspects, an audio device includes: a body, a slot recessed from an outer surface of the body, and a coupler in the slot, the coupler including at least one protrusion for selectively engaging an accessory attachment for an accessory.

In additional particular aspects, an accessory for an audio device includes: a main body; and an accessory attachment coupled with the main body and configured to selectively engage a coupler on the audio device, where the accessory attachment is configured for toolless engagement and disengagement with the coupler.

In further particular aspects, an audio device includes: a body, a slot recessed from an outer surface of the body, a coupler in the slot, the coupler including at least one protrusion, and an accessory including an accessory attachment connected with the coupler, the accessory attachment enabling selective engagement of the coupler.

Implementations may include one of the following features, or any combination thereof.

In some cases, the coupler provides a detent against removal of the accessory attachment when engaged.

In particular implementations, the at least one protrusion requires multi-step actuation to overcome the detent.

In certain aspects, the coupler includes at least two protrusions.

In some cases, the coupler includes at least three protrusions. In further examples, the coupler includes four protrusions.

In certain examples, the audio device weighs at least two (2) kilograms (kg). In particular cases, the audio device weighs approximately 2 kg to approximately 3 kg.

In particular implementations, the coupler includes a metal or a metal alloy.

In some aspects, the coupler enables toolless attachment and removal of the accessory attachment.

In particular cases, the coupler is located in a port and is recessed from an outer surface of the body.

In some implementations, the port complies with an ingress protection (IP) rating for the audio device.

In certain aspects, the IP rating is at least IP 67.

In particular cases, the port is sized to receive the accessory attachment.

In some examples, the audio device further includes a removable plug configured to substantially fill the port and provide aesthetic continuity in the outer surface of the body.

In particular implementations, when coupled, the accessory enables transport of the audio device.

In certain aspects, the coupler enables at least two distinct types of accessory to selectively engage with the audio device.

In some cases, the slot includes a compliant material along at least one surface thereof, where interaction between the accessory attachment and the compliant material aids in retention of the accessory attachment by the coupler.

In some examples, the compliant material includes a silicone over-molded on a rigid material. The compliant material can provide an ingress protection (IP) seal at a bottom of the slot, and in particular examples, provides and IP seal around a screw or fastener.

In particular cases, the compliant material provides spring pressure to aid in retention of the accessory attachment by the coupler.

In particular aspects, the accessory attachment includes at least two materials.

In certain cases, the main body includes an arcuate feature and the accessory attachment includes an eyelet coupler connected with the arcuate feature. In some examples, the arcuate feature includes a loop or a hook In some aspects, the eyelet includes a rigid core material and a compliant cover material. In certain examples, the rigid core material includes nylon and the compliant cover material includes silicone.

In particular implementations, the compliant cover material aids in impact protection for the audio device.

In certain cases, the accessory attachment includes at least one complementary coupler for selectively engaging the coupler and maintaining connection with the audio device during at least one of transport or use of the audio device.

In some aspects, the coupler includes a protrusion and the complementary coupler includes a slot having at least one turn. In some examples, a set of protrusions and complementary couplers are used to maintain connection with the audio device, for example, along a quarter turn path.

In certain cases, a shoulder strap or carrying strap includes the accessory.

In some cases, the accessory includes a carrying strap.

In particular aspects, the accessory is configured for toolless engagement and disengagement with the coupler.

In certain implementations, the audio device further includes another accessory including an accessory attachment configured to connect with the coupler, where only one of the accessory or the other accessory is configured to connect with the coupler at a time.

In some cases, the audio device further includes at least one driver and a set of passive radiators in the body.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

Figure 1:
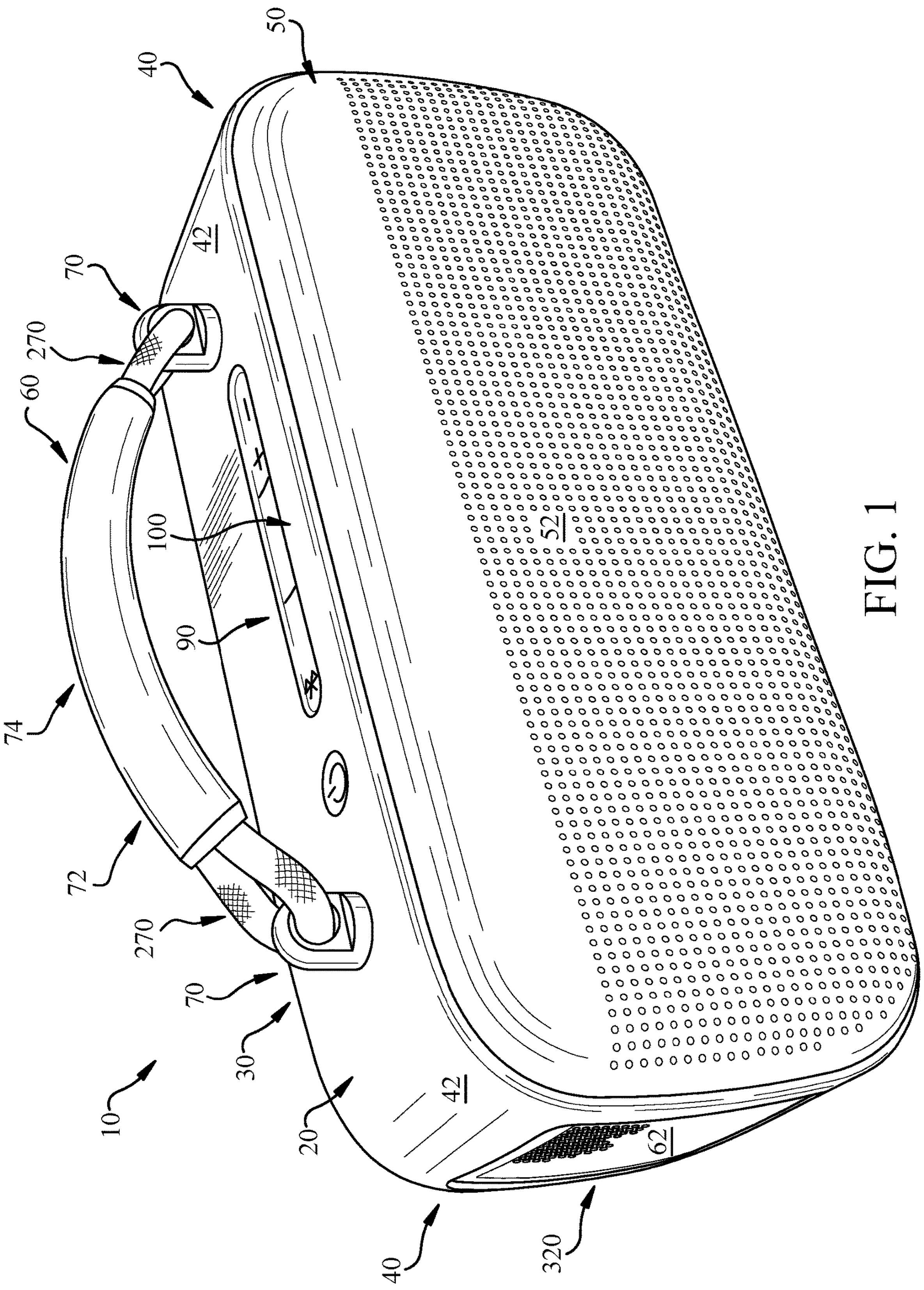
FIG. 1 shows a perspective view of an audio device according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure provides, at least in part, an audio device that beneficially incorporates a coupler in a recessed slot for selectively engaging an accessory attachment for an accessory. This disclosure is also based, at least in part, on an accessory for an audio device that includes an accessory attachment for selectively engaging a coupler on the audio device, for example, in toolless engagement and/or disengagement with the coupler. In various implementations, the coupler is located in a port that is recessed from an outer surface of the audio device, and the port provides ingress protection for the audio device. In certain cases, the coupler enables at least two distinct types of accessory to selectively engage with the audio device. In further cases, the coupler provides a detent against removal of the accessory attachment when engaged. The audio devices disclosed according to various implementations can enable selective coupling of a device accessory such as a handle or strap, without the need for a tool. Further, the device accessory can be securely engaged with the coupler to enable transport and/or suspension of the audio device.

Commonly labeled components in the FIGURES are considered to be substantially equivalent components for the purposes of illustration, and redundant discussion of those components is omitted for clarity.

Figure 2:
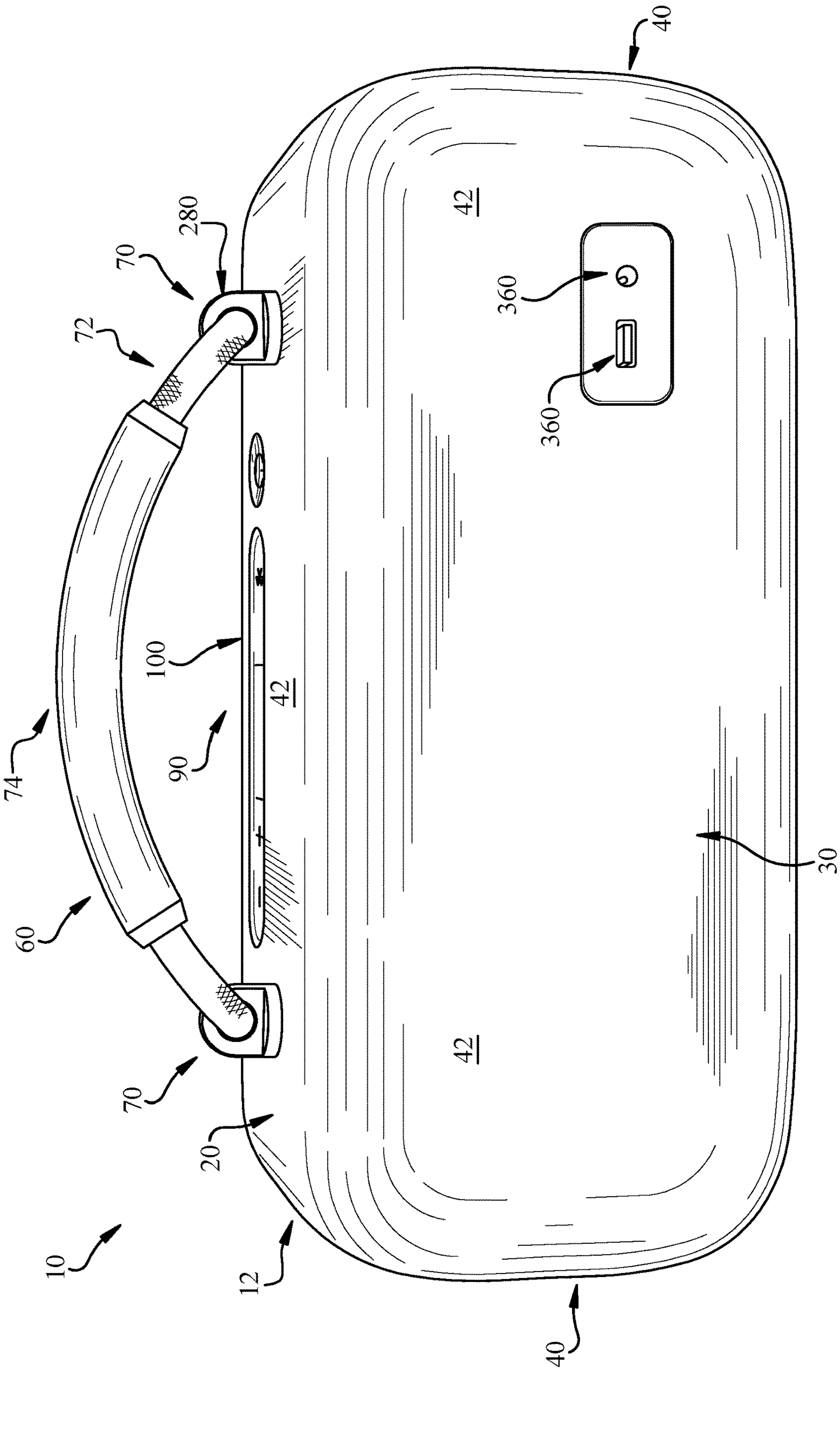
FIG. 2 shows a rear view of the audio device of FIG. 1.

FIG. 1 shows a perspective view of an audio device 10 according to various implementations. FIG. 2 shows a rear view of the audio device 10. As shown, the audio device 10 can include a body 12 including an outer enclosure 20 that houses an acoustic cavity (not shown) and electronic components such as a transducer (or, driver), controller (e.g., one or more control circuits such as found on printed circuit boards (PCBs), and communications equipment such as one or more wireless communication devices and associated chips/chipsets. In particular implementations, the audio device 10 includes a set of passive radiators, which in particular cases, define an acoustic cavity within the body.

The outer enclosure 20 is shown in this example implementation as having a back 30, sidewalls 40, and a front 50. In some cases, the front 50 includes a grille 52. However, it is understood that the grille 52 can be located in distinct positions in different implementations. In some cases, vents (or additional grilles 62) are shown along portions of sidewalls 40, e.g., on sides of the outer enclosure 20. In one example, the back 30 and sidewalls 40 are formed of a single (i.e., continuous) piece of material, e.g., a compliant material including silicone and/or rubber. However, the back 30 and sidewalls 40 can be formed of distinct materials or distinct pieces of material in additional implementations. Additional examples of material types, sidewall and back configurations, and features of an outer enclosure for an audio device are described in U.S. Pat. No. 11,683,621 ("Ingress Resistant Portable Speaker," issued on Jun. 20, 2023), the entire contents of which are incorporated by reference herein. In one example, the back 30 and sidewalls 40 include a cover (or an outer surface) 42 that is the outermost surface of the audio device 10. In the example audio device 10 shown in FIGS. 1 and 2, an accessory 60 is shown coupled with the body 12 at one or more accessory attachments (or, mounts) 70. In certain cases, the accessory 60 has a main body 72 that spans between accessory attachments 70. In particular examples, the main body 72 includes a handle, a hook, a strap, an adhesive connector, etc. In the disclosed example in FIGS. 1 and 2, the main body 72 includes a handle 74. The accessory attachment(s) 70 (two shown) enable mounting of the accessory 60 such as a handle, strap, clip, etc. An interface 90, which can include one or more interface buttons 100, is illustrated along one of the sidewalls 40 in this example, e.g., along an upper surface.

Figure 3:
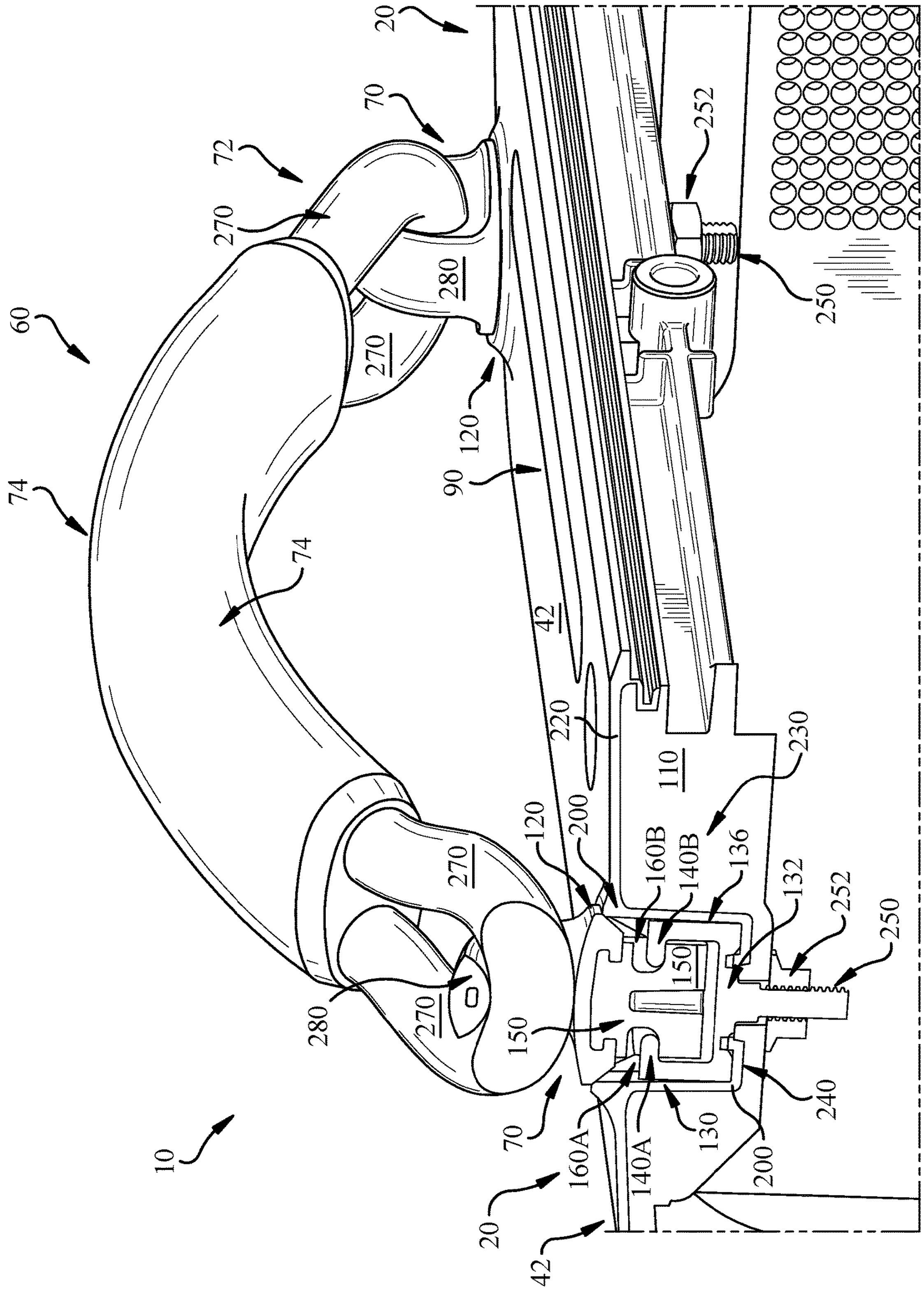
FIG. 3 shows a cross-section of a portion of an audio device according to various implementations.
Figure 4:
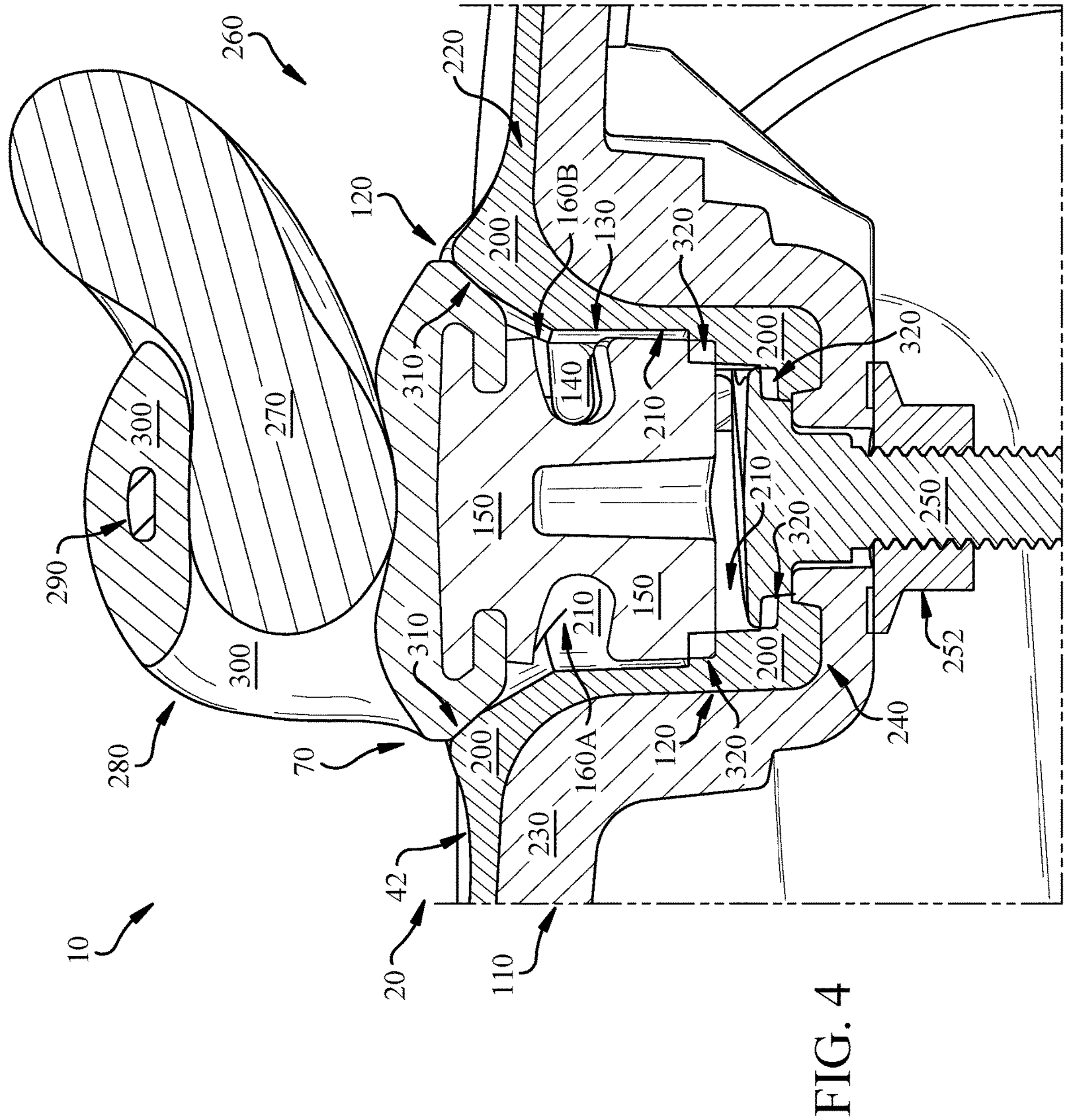
FIG. 4 shows another cross-section of a portion of an audio device according to various implementations.

FIG. 3 shows a partial cross-section of the body 12 taken through the outer enclosure 20 and an inner enclosure 110 contained within the outer enclosure 20. In particular, the cross-section is taken through the outer enclosure 20 and the inner enclosure 110 proximate a slot 120 for engaging the accessory 60. FIG. 4 shows a close-up cross-section through the slot 120. In various implementations, the slot 120 is recessed from the outer surface 42 of the body 12. As illustrated in FIGS. 3 and 4, a coupler 130 can be located in the slot 120 for selectively engaging the accessory attachment 70. In particular cases, the coupler 130 includes at least one protrusion 140 for selectively engaging the accessory attachment 70 for the accessory 60. In various implementations, the coupler 130 (e.g., protrusion(s)) includes a metal or a metal alloy. In certain examples, the coupler 130 includes a bracket (e.g., a C-shaped bracket) 132 with a base 134 that is positioned at the bottom of slot 120. In certain cases, the bracket 132 includes arms 136 extending from the base 134.

Figure 5:
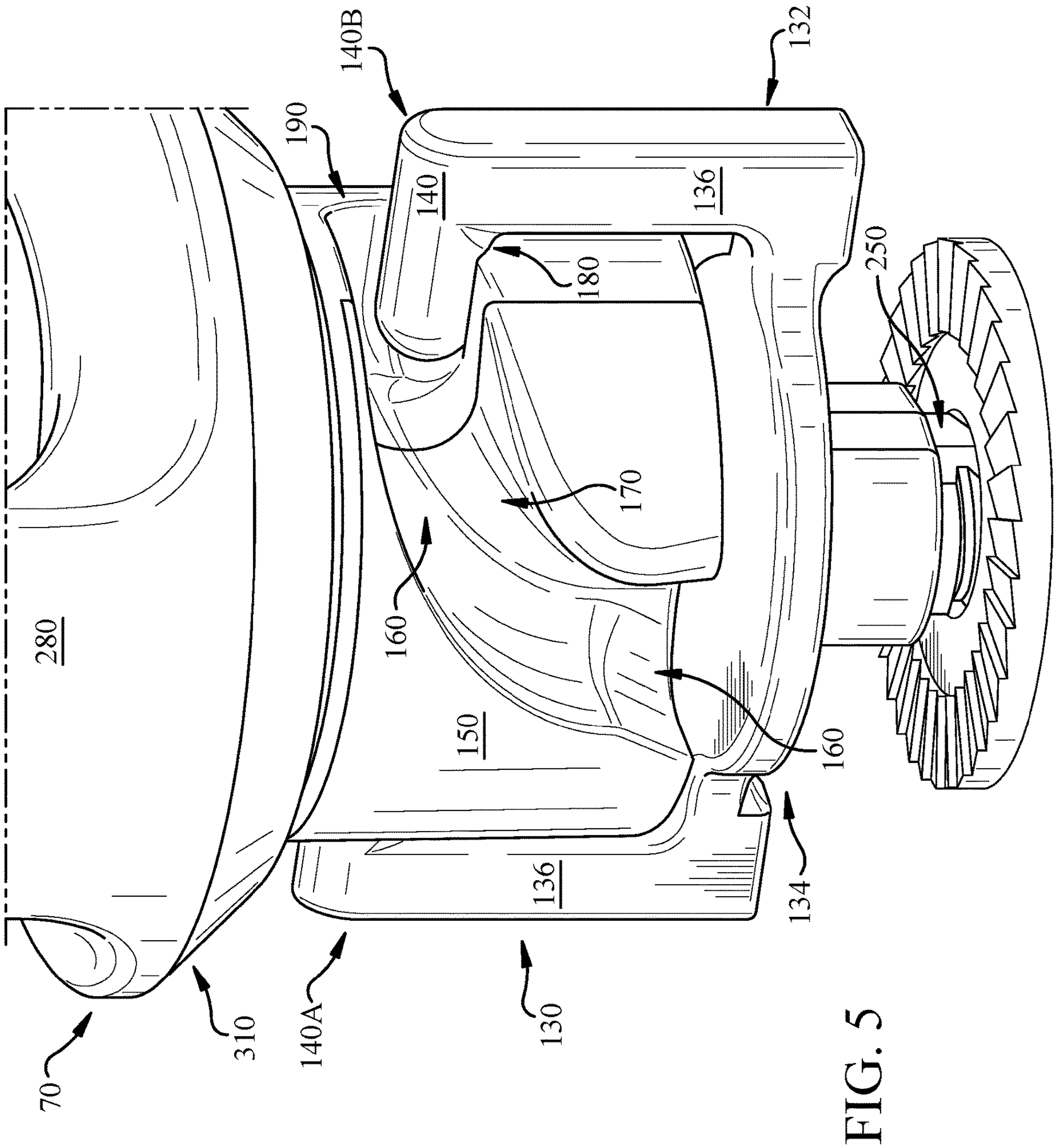
FIG. 5 is a perspective view of an accessory connection in an audio device according to various implementations.

In certain examples, such as illustrated in the isolated view of the accessory attachment 70 and the coupler 130 in FIG. 5, the coupler 130 can include a set of protrusions 140 for engaging the accessory attachment 70. In various implementations, the protrusions 140 extend from respective arms 136. In certain examples, the coupler 130 includes at least one protrusion 140, at least two protrusions 140, at least three protrusions 140, or at least four protrusions 140. In a particular example, the coupler 130 includes two protrusions 140.

In a particular example, the accessory attachment 70 includes at least one complementary coupler 150 for selectively engaging the coupler 130 and maintaining connection with the audio device 10 (e.g., main body 12) during transport and/or use of the audio device 10. In specific cases, the complementary coupler 150 includes a slot 160 including at least one turn 170 for engaging a protrusion 140. FIGS. 3-5 illustrate one example where the coupler 130 includes two distinct protrusions 140A, 140B for selectively engaging two distinct slots 160A, 160B in the complementary coupler 150. The slots 160A, 160B can each include a turn 170 for engaging respective protrusions 140A, 140B. In various implementations, the slots 160 define a quarter turn path, such that slots 160A, 160B include the respective turns 170 that span approximately 90 degrees (around the accessory attachment 70). While multiple protrusions 140 are illustrated in FIGS. 3-5, it is understood that a single coupler 130 (e.g., one protrusion 140) can be used to retain the connection with the complementary coupler 150 in certain cases. In further implementations, a greater number of protrusions, e.g., three, four, or more protrusions 150 can be used to retain the connection with the complementary coupler 150. In certation of those cases, the complementary coupler 150 can include a corresponding number of slots 160 for engaging the protrusions 140.

Figure 6:
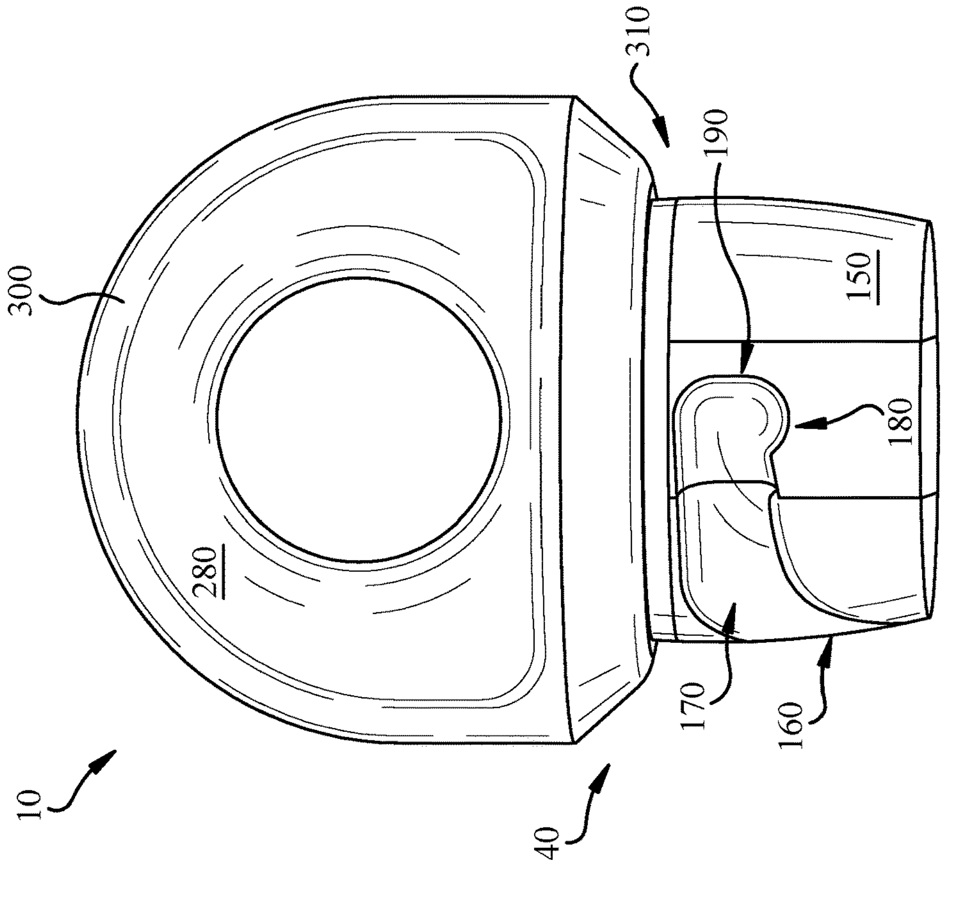
FIG. 6 is a side view of an accessory connector for an audio device according to various implementations.

As described herein, the coupler 130 can provide a detent against removal of the accessory attachment 70 when engaged. In certain cases, the protrusion 140 requires multi-step actuation to overcome the detent. Turning to FIG. 6, in certain cases, each slot 160 can include a notch or recess 180, e.g., proximate a terminal end 190 thereof. In various implementations, the notch or recess 180 is continuous with the slot 160 but deviates from the path of the slot 160 in at least one direction, e.g., extending from the slot 160 in a downward direction. In certain cases, the notch or recess 180 has a greater largest dimension than the remainder of the slot 160. In certain cases, the notch or recess 180 has at least one section that extends in a direction that is angled with respect to the slot 160. This notch or recess 180 is configured to engage the protrusion 140 and prevent unintentional movement of the accessory attachment 70. In particular cases, the slot 160 including the notch or recess 180 enables multi-step actuation of the accessory attachment 70, for example, without a tool.

As described herein, the slot 120 in the outer surface 42 can include a compliant material 200 along at least one surface 210 thereof. In some cases, the compliant material 200 is located along a portion of a sidewall of the slot 160 and/or a portion of a bottom of the slot 160. In various implementations, the compliant material 200 in the slot 160 is configured to provide a spring pressure against the accessory attachment 70 when engaged. In one example, interaction between the accessory attachment 70 and the compliant material 200 aids in retention of the accessory attachment 70 by the coupler 130. In a particular example, to disengage the protrusion 140 from the slot 160 via the notch or recess 180, a user applies downward force on the accessory attachment 70 to overcome the spring pressure from the compliant material and remove the protrusion from the notch or recess 180. In the same or continuous motion, the user rotates the accessory attachment 70, thereby guiding the protrusion 140 through the slot 160 and drawing the accessory attachment 70 from the slot 120.

In some cases, the compliant material 200 includes a silicone 220 over-molded on a rigid material 230. In other cases, the compliant material 200 is a soft material over-molded on the rigid material, e.g., a soft over mold material. The compliant material 200 can provide an ingress protection (IP) seal at a bottom 240 of the slot 120, and in particular cases, provides and IP seal around a screw or fastener 250 at the bottom of the slot 120. In some cases, the screw or fastener 250 includes or otherwise interfaces with a washer 252. In certain cases, the screw or fastener 250 is an integral part of the coupler 130, e.g., at or near the base 132. In particular cases, the compliant material 200 provides spring pressure to aid in retention of the accessory attachment 70 by the coupler 130. The spring pressure can at least partially enable toolless engagement and disengagement of the accessory attachment 70 and the coupler 130.

Figure 8:
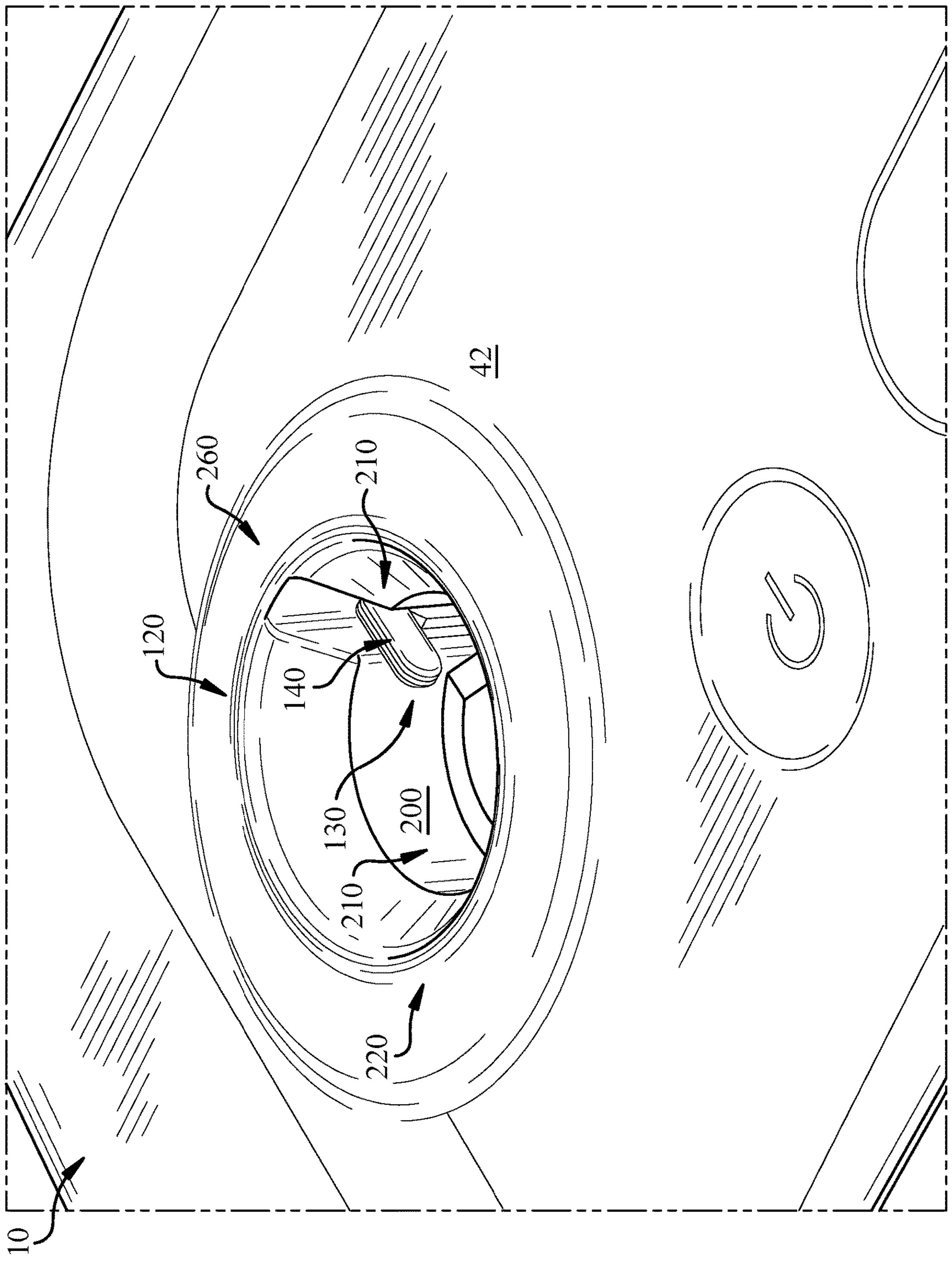
FIG. 8 is a perspective view of a port for an accessory connector in an audio device according to various implementations.

In particular implementations, as shown in the perspective view of the slot 120 in FIG. 8, the coupler 130 can be located in a port 260 in the outer surface 42 of the body 12. In various implementations, the port 260 is sized to receive the accessory attachment 70, e.g., with an insert-and-rotate motion. In certain cases, the coupler 130 is recessed from the outer surface 42 of the body 12, such that the coupler 130 does not protrude beyond that outer surface 42. In certain cases, the port 260 complies with an IP rating for the audio device 10. That is, the port 260 maintains, or does not compromise, an IP rating for the audio device 10. In some examples, as noted herein, the IP rating is at least IP 67. In some examples, as noted herein, the audio device 10 further includes a removable plug (not shown) configured to substantially fill the port 260 and provide aesthetic continuity in the outer surface 42 of the body 12. For example, a removable plug can have a similar form factor as the accessory attachment 70, without a feature for attaching to an accessory. That is, a removable plug can include a complementary coupler 150 for engaging the coupler 130 in the port 260 as described herein. The removable plug may have a depth approximately equal to the depth of the slot 120 as measured from the outer surface 42, such that when engaged with the coupler 130, the upper surface of the removable plug is approximately flush with the outer surface 42 of the body 12.

Returning to FIGS. 3-7, and with particular reference to FIGS. 3, 4, and 7, additional aspects of the accessory 60 and accessory attachment(s) 70 are shown. As noted herein, in particular cases, the accessory 60 includes a main body 72. In some cases, the main body 72 includes an arcuate feature 270, and the accessory attachment 70 includes an eyelet coupler 280 connected with the arcuate feature 270. In some examples, the arcuate feature 270 includes a loop or a hook.

Figure 7:
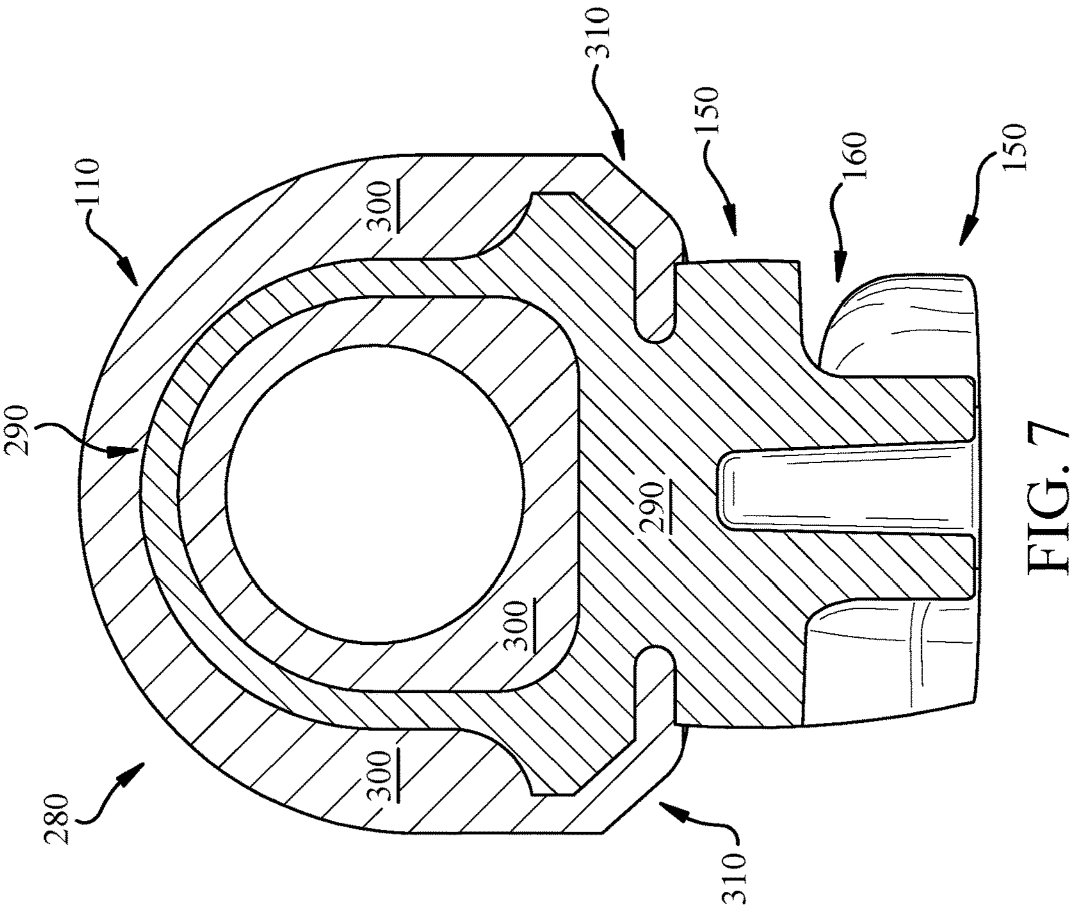
FIG. 7 is a partial cross-section of the accessory connector in FIG. 6 according to various implementations.

In a particular example, as is visible in FIGS. 4 and 7, the eyelet coupler 280 can include a rigid core material 290 and a compliant cover material 300 over the rigid core material 290. In certain non-limiting examples, the rigid core material 290 includes nylon. In additional non-limiting examples, the compliant cover material 300 includes silicone. In particular implementations, the compliant cover material 300 aids in impact protection for the audio device 10, e.g., by absorbing impact when the audio device 10 is dropped or bumped against a surface. In certain cases, the accessory attachment 70 also includes at least two materials, e.g., a rigid core material and a compliant cover material similar to the eyelet coupler 280. In some cases, a portion of the rigid core material 290 of the eyelet coupler 280 is continuous with the accessory attachment 70. Further, a portion 310 of the compliant cover material 300 can extend over part of the accessory attachment 70, and in some cases, is configured to interface with the outer surface (cover) 42 of the audio device 10.

Various compliant features of the audio device 10 can be configured to absorb impact and/or aid in sealing the device, e.g., to provide ingress protection. In addition to the interface 310 between compliant material 200 around the slot 120 and the compliant cover material 300 of the accessory attachment 70, the compliant material 200 can also be configured to provide impact protection and/or aid in sealing the audio device in additional areas around the slot 120. For example, FIG. 4 illustrates compliant interfaces 320 between portions of the complementary coupler 150 and the compliant material 200, as well as between the screw or fastener 250 and the compliant material 200. These compliant interfaces 320 can aid in sealing the slot 120, e.g., in maintaining an IP standard such as IP 67. These compliant interfaces 320 can also aid in impact protection for the audio device 10, e.g., when an impact occurs at or near the accessory attachment 70. Further, compliant interfaces 320 between the screw or fastener 250 and the compliant material 200 can aid in maintaining the IP standard of the audio device 10 even when the accessory attachment 70 is disconnected, e.g., when the accessory 60 is removed or when a plug is secured in the slot 120.

As noted herein, the modular nature of the accessory 60, e.g., via accessory attachments 70 and corresponding slots 120 in the audio device 10 can enable distinct uses of the audio device, as well as distinct aesthetics. In various implementations, the accessory attachments 70 and corresponding slots 120 are configured to enable support of the audio device 10 in transport, suspension, active usage, etc. In various implementations, the audio device 10 weighs at least two (2) kilograms (kg). In particular cases, the audio device 10 weighs approximately 2 kg to approximately 3 kg. As such, an accessory 60 can ease transport of the audio device 10 for many users. Examples of such accessories 60 can include shoulder straps, carrying straps, etc. Further, the modular nature of the accessory attachment 70 and slot 120 interface enables at least two distinct types of accessory 60 to selectively engage with the audio device 10. For example, distinct accessories 60 can be exchanged with the slot 120 in a manner of seconds without the need for a tool. In these examples, two or more distinct accessories can be configured to connect with the coupler, one at a time.

As noted herein, the audio devices 10 disclosed according to various implementations provide numerous benefits relative to conventional audio devices. For example, audio devices disclosed herein can be easily adapted for distinct uses, while maintaining ingress protection (IP) standards. Further, the audio devices disclosed according to various implementations can enable selective coupling of a device accessory such as a handle or strap, without the need for a tool. The device accessory can be securely engaged with the coupler to enable transport and/or suspension of the audio device.

It is understood that the relative proportions, sizes and shapes of the audio device 10 and components and features thereof as shown in the FIGURES included herein can be merely illustrative of such physical attributes of these components. That is, these proportions, shapes and sizes can be modified according to various implementations to fit a variety of products. For example, while a substantially block (or rectangular cross-sectional) shaped loudspeaker may be shown according to particular implementations, it is understood that the loudspeaker could also take on other three-dimensional shapes in order to provide acoustic functions described herein.

The term "approximately" as used with respect to values herein can allot for a nominal variation from absolute values, e.g., of several percent or less. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). Similarly, the term "in response to" is used to indicate any of its ordinary meanings, including "in response to at least."

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. An audio device comprising:

a body, a slot recessed from an outer surface of the body, and a coupler in the slot, the coupler including at least one protrusion for selectively engaging an accessory attachment for an accessory, wherein the coupler enables at least two distinct types of accessory to selectively engage with the audio device.

2. The audio device of claim 1, wherein the coupler provides a detent against removal of the accessory attachment when engaged, wherein the at least one protrusion requires multi-step actuation to overcome the detent, wherein one step in the multi-step actuation includes rotation.

3. The audio device of claim 1, wherein the coupler includes at least two protrusions.

4. The audio device of claim 1, wherein the coupler includes a metal or a metal alloy.

5. The audio device of claim 1, wherein the coupler enables toolless attachment and removal of the accessory attachment, wherein the coupler is located in a port and is recessed from an outer surface of the body.

6. The audio device of claim 5, wherein the port complies with an ingress protection (IP) rating for the audio device, wherein the IP rating is at least IP 67.

7. The audio device of claim 5, further comprising a removable plug configured to fill the port and provide aesthetic continuity in the outer surface of the body.

8. The audio device of claim 1, wherein when coupled, the accessory enables transport of the audio device.

9. The audio device of claim 1, wherein the slot includes a compliant material along at least one surface thereof, wherein interaction between the accessory attachment and the compliant material aids in retention of the accessory attachment by the coupler.

10. An accessory for an audio device, the accessory comprising:

a main body; and an accessory attachment coupled with the main body and configured to selectively engage a coupler including at least one protrusion in a slot on the audio device, wherein the accessory attachment is configured for toolless engagement and disengagement with the coupler, and wherein the accessory attachment is configured to engage and disengage with the coupler via a rotational motion, wherein when the accessory attachment is engaged with the coupler in the slot, disengaging the protrusion from the slot includes applying a downward force on the accessory attachment and rotation thereof to guide the protrusion through the slot.

11. The accessory of claim 10, wherein the main body includes an arcuate feature and wherein the accessory attachment includes an eyelet coupler connected with the arcuate feature, wherein the eyelet includes a rigid core material and a compliant cover material, wherein the compliant cover material aids in impact protection for the audio device.

12. An audio device comprising a body, a slot recessed from an outer surface of the body, a coupler in the slot, the coupler including at least one protrusion, a first accessory including an accessory attachment connected with the coupler, the accessory attachment enabling selective engagement of the coupler; and a second accessory, of a type distinct from the first accessory, including an accessory attachment configured to connect with the coupler, wherein only one of the first accessory or the second accessory is configured to connect with the coupler at a time, and wherein the first accessory and the second accessory are configured for toolless engagement and disengagement with the coupler in the slot.

13. The audio device of claim 12, wherein the coupler provides a detent against removal of the accessory attachment when engaged, wherein the at least one protrusion requires multi-step actuation to overcome the detent.

14. The audio device of claim 12, further comprising at least one driver and a set of passive radiators in the body.

15. The audio device of claim 1, wherein the accessory attachment includes at least one complementary coupler for selectively engaging the coupler and maintaining connection with the audio device during at least one of transport or use of the audio device, wherein the at least one complementary coupler includes a slot including at least one turn for engaging the at least one protrusion in a rotational coupling.

16. The audio device of claim 15, wherein the slot in the at least one complementary coupler includes a notch or recess proximate a terminal end thereof configured to:

engage the at least one protrusion and prevent unintentional movement of the accessory attachment, and enable multi-step actuation of the accessory attachment.

17. The audio device of claim 9, wherein the compliant material provides an ingress protection (IP) seal at a bottom of the slot.

18. The audio device of claim 5, wherein one of the distinct types of accessory is a handle and one of the distinct types of accessory is a carrying strap distinctly sized from the handle.

19. The audio device of claim 18, wherein the coupler further enables toolless attachment and removal of an accessory attachment for the handle and an accessory attachment for the carrying strap.

20. The audio device of claim 9, wherein the compliant material along at least one surface of the slot provides spring pressure against the accessory attachment when the accessory attachment is engaged with the coupler.

21. The audio device of claim 20, wherein the accessory attachment includes a complementary coupler for selectively engaging the coupler in the slot, wherein the complementary coupler includes a slot having at least one turn for engaging the at least one protrusion, wherein when the accessory attachment is engaged with the coupler in the slot, disengaging the protrusion from the slot includes applying a downward force on the accessory attachment and rotation thereof to guide the protrusion through the slot.

22. The audio device of claim 16, wherein the notch or recess is continuous with the slot and has a greater largest dimension than a remainder of the slot, wherein the notch or recess is positioned to: engage the protrusion and prevent unintentional movement of the accessory attachment, and enable multi-step toolless actuation of the accessory attachment.

* * * * *